(12) United States Patent
Baker

(10) Patent No.: US 11,877,694 B2
(45) Date of Patent: *Jan. 23, 2024

(54) PIZZA OVEN ACCESSORY FOR BARBECUE GRILL

(71) Applicant: GMG PRODUCTS, LLC., Lakeside, OR (US)

(72) Inventor: David Baker, Lakeside, OR (US)

(73) Assignee: GMG Products, LLC, Lakeside, OR (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/061,964

(22) Filed: Oct. 2, 2020

(65) Prior Publication Data

US 2021/0015301 A1 Jan. 21, 2021

Related U.S. Application Data

(63) Continuation of application No. 15/333,600, filed on Oct. 25, 2016, now Pat. No. 10,827,878.

(51) Int. Cl.
*A47J 37/08* (2006.01)
*A47J 37/06* (2006.01)
*A47J 37/07* (2006.01)

(52) U.S. Cl.
CPC ....... *A47J 37/0885* (2013.01); *A47J 37/0658* (2013.01); *A47J 37/0786* (2013.01)

(58) Field of Classification Search
CPC . A47J 37/0885; A47J 37/0658; A47J 37/0786
USPC .......................................................... 99/447
See application file for complete search history.

(56) References Cited

U.S. PATENT DOCUMENTS

| | | | | |
|---|---|---|---|---|
| 100,410 A | * | 3/1870 | Hull | A47J 37/0786 99/400 |
| 1,650,634 A | * | 11/1927 | Lutzler | A47J 37/10 126/41 R |
| 2,354,240 A | * | 7/1944 | Young | A47J 37/0611 99/378 |
| 3,327,698 A | * | 6/1967 | Leslie | A47J 37/07 126/25 R |
| 3,474,725 A | * | 10/1969 | McClaren | A47J 37/0688 219/400 |
| 3,745,303 A | * | 7/1973 | Epperson | A47J 37/06 219/218 |
| 3,814,005 A | * | 6/1974 | Widdel | A47J 37/0611 99/380 |

(Continued)

*Primary Examiner* — Jimmy Chou
(74) *Attorney, Agent, or Firm* — Lowe Graham Jones PLLC

(57) ABSTRACT

A cooking accessory insert for a cooking grill includes a heat distribution duct that, installed, extends from a burner proximate to the bottom of the grill's fire box generally to a cooking level near the top of the fire box. The heat distribution duct is defined by a plurality of side walls extending from a top end of the heat distribution duct to a bottom end, tapering inward, or narrowing, from top to bottom. A top surface substantially covers the top end of the heat distribution duct, while the bottom is open. A cover is provided to cover the top surface, defining a baking chamber between the cover and the top surface. A cooking surface element such as a pizza stone is removably disposed on the top surface, spaced apart from the top surface by a plurality of spacers.

8 Claims, 4 Drawing Sheets

(56) References Cited

U.S. PATENT DOCUMENTS

| | | | | | |
|---|---|---|---|---|---|
| 4,241,650 A * | 12/1980 | John | ............... | A47J 37/06 99/359 |
| 4,454,805 A * | 6/1984 | Matthews | ............... | A47J 37/0682 99/446 |
| 4,481,408 A * | 11/1984 | Scheufler | ............... | A47J 37/0704 126/258 |
| 4,508,094 A * | 4/1985 | Hait | ............... | F24B 1/205 126/9 B |
| 4,531,505 A * | 7/1985 | Hait | ............... | F24B 1/205 126/25 R |
| 4,591,698 A * | 5/1986 | Chang | ............... | A47J 37/015 219/442 |
| 4,788,905 A * | 12/1988 | Von Kohorn | ............... | A47J 37/0781 454/189 |
| 4,867,050 A * | 9/1989 | Patenaude | ............... | A47J 37/0754 99/481 |
| 4,910,372 A * | 3/1990 | Vukich | ............... | H05B 6/1209 219/622 |
| 4,976,252 A * | 12/1990 | Cianciola | ............... | A47J 37/01 126/41 R |
| 4,987,827 A * | 1/1991 | Marquez | ............... | A47J 37/0611 99/425 |
| 5,086,752 A * | 2/1992 | Hait | ............... | A47J 37/0704 126/25 R |
| 5,168,796 A * | 12/1992 | Porton | ............... | A47J 37/0781 126/41 R |
| 5,172,682 A * | 12/1992 | Luebke | ............... | A21B 1/245 219/400 |
| 5,176,067 A * | 1/1993 | Higgins | ............... | A47J 37/0709 99/450 |
| 5,197,379 A * | 3/1993 | Leonard, Jr. | ............... | A47J 37/0704 126/25 R |
| 5,218,950 A * | 6/1993 | Hait | ............... | F24C 1/16 126/26 |
| 5,276,307 A * | 1/1994 | Higgins | ............... | A47J 37/0709 219/541 |
| 5,287,799 A * | 2/1994 | Pickering | ............... | F24C 15/2042 126/211 |
| 5,313,877 A * | 5/1994 | Holland | ............... | A47J 37/0704 126/41 R |
| D347,548 S * | 6/1994 | Boehm | ............... | D7/323 |
| 5,586,488 A * | 12/1996 | Liu | ............... | A47J 37/0658 219/400 |
| 5,605,092 A * | 2/1997 | Riccio | ............... | A21B 1/28 99/447 |
| 5,649,477 A * | 7/1997 | Lingwood | ............... | A47J 37/0713 99/446 |
| 5,655,435 A * | 8/1997 | Rachesky | ............... | A47J 37/0704 99/449 |
| 5,775,315 A * | 7/1998 | Baykal | ............... | A47J 37/0781 126/26 |
| 5,797,386 A * | 8/1998 | Orr | ............... | A47J 37/0763 126/25 R |
| 5,809,871 A * | 9/1998 | Arathoon | ............... | A47J 37/0611 99/380 |
| 5,809,991 A * | 9/1998 | Pai | ............... | A47J 37/0786 126/245 |
| 5,821,507 A * | 10/1998 | Sasaki | ............... | H05B 6/1227 219/622 |
| 5,884,006 A * | 3/1999 | Frohlich | ............... | F28D 20/028 126/263.01 |
| 5,891,498 A * | 4/1999 | Boehler | ............... | A23B 4/052 126/41 R |
| 6,065,464 A * | 5/2000 | Zajec | ............... | A47J 37/0786 126/25 B |
| 6,065,466 A * | 5/2000 | Baykal | ............... | A47J 37/0781 126/41 R |
| 6,097,004 A * | 8/2000 | Seul | ............... | H05B 3/686 219/450.1 |
| 6,108,489 A * | 8/2000 | Frohlich | ............... | F28D 20/028 392/339 |
| 6,125,740 A * | 10/2000 | Hedrington | ............... | A47J 37/043 99/392 |
| 6,187,359 B1 * | 2/2001 | Zuccarini | ............... | A47J 37/0786 126/41 R |
| D439,792 S * | 4/2001 | Hedrington | ............... | D7/323 |
| 6,213,006 B1 * | 4/2001 | Reardon | ............... | A47J 37/0704 99/450 |
| 6,223,737 B1 * | 5/2001 | Buckner | ............... | F23L 1/02 110/294 |
| 6,263,786 B1 * | 7/2001 | Raio | ............... | A47J 37/0611 99/349 |
| 6,289,795 B1 * | 9/2001 | McLemore | ............... | A47J 37/0786 126/41 R |
| 6,425,388 B1 * | 7/2002 | Korinchock | ............... | A21B 1/28 126/41 R |
| 6,467,400 B2 * | 10/2002 | Raio | ............... | A47J 37/0611 100/92 |
| 6,525,299 B2 * | 2/2003 | Hannon | ............... | A47J 27/004 219/385 |
| 6,675,794 B1 * | 1/2004 | Yang | ............... | F24B 15/005 126/30 |
| 6,874,496 B2 * | 4/2005 | Waits | ............... | A47J 37/0704 126/25 R |
| 7,107,983 B1 * | 9/2006 | West | ............... | A47J 36/2477 126/25 R |
| 7,312,424 B2 * | 12/2007 | Hannon | ............... | A47J 36/04 99/426 |
| 7,449,665 B2 * | 11/2008 | Fadelli | ............... | H05B 6/6402 219/685 |
| 7,575,002 B2 * | 8/2009 | DeMars | ............... | A47J 37/0704 126/542 |
| 7,681,493 B2 * | 3/2010 | Moore | ............... | A23B 4/052 99/481 |
| 7,685,931 B2 * | 3/2010 | Rivera | ............... | A47J 31/08 206/0.5 |
| 7,686,010 B2 * | 3/2010 | Gustavsen | ............... | F24B 1/003 126/29 |
| D624,781 S * | 10/2010 | Allen | ............... | D7/332 |
| 7,832,330 B1 * | 11/2010 | Thompson | ............... | A47J 37/0786 99/481 |
| 8,291,896 B1 * | 10/2012 | Gonnella | ............... | A47J 37/0647 126/39 C |
| 8,578,927 B2 * | 11/2013 | Gustavsen | ............... | F24B 1/003 126/1 R |
| 8,662,069 B2 * | 3/2014 | Gasparini | ............... | F24D 14/08 126/39 J |
| 8,662,070 B2 * | 3/2014 | Johnston | ............... | A47J 37/0713 126/39 J |
| D707,075 S * | 6/2014 | Fung | ............... | D7/363 |
| 8,763,519 B2 * | 7/2014 | Ricchio | ............... | A47J 37/0611 99/372 |
| 9,182,129 B2 * | 11/2015 | Dahle | ............... | A47J 37/0727 |
| 9,226,343 B2 * | 12/2015 | Moon | ............... | H05B 6/062 |
| 9,635,979 B2 * | 5/2017 | Abrams | ............... | A47J 37/0658 |
| 9,668,615 B2 * | 6/2017 | Contarino, Jr. | ............... | A47J 37/07 |
| 9,718,220 B1 * | 8/2017 | Claridge Huggins | ............... | A47J 37/0759 |
| 9,848,731 B2 * | 12/2017 | Dahle | ............... | F24C 3/027 |
| D828,713 S * | 9/2018 | Correa | ............... | D7/359 |
| 11,166,590 B2 * | 11/2021 | Zheng | ............... | A47J 37/0713 |
| 2002/0069764 A1 * | 6/2002 | Cohen | ............... | A47J 37/0611 426/523 |
| 2004/0094142 A1 * | 5/2004 | Christensen | ............... | A47J 37/067 126/41 R |
| 2004/0154611 A1 * | 8/2004 | Beech | ............... | A21B 3/00 126/144 |
| 2004/0255926 A1 * | 12/2004 | Waits | ............... | A23B 4/044 126/50 |
| 2005/0205076 A1 * | 9/2005 | Boucher | ............... | A47J 37/0759 126/25 R |
| 2006/0124120 A1 * | 6/2006 | Gross | ............... | A47J 37/079 126/25 B |
| 2006/0225580 A1 * | 10/2006 | Fernandez | ............... | A47J 37/0629 99/419 |
| 2006/0236995 A1 * | 10/2006 | Chang | ............... | A47J 37/079 126/25 B |

(56) References Cited

U.S. PATENT DOCUMENTS

| | | | | |
|---|---|---|---|---|
| 2007/0108177 A1* | 5/2007 | Engelhardt | | A21B 1/44 |
| | | | | 219/388 |
| 2007/0169636 A1* | 7/2007 | Carlson | | A47G 19/022 |
| | | | | 99/279 |
| 2007/0221191 A1* | 9/2007 | O'Brien | | A47J 37/0713 |
| | | | | 126/25 R |
| 2007/0277800 A1* | 12/2007 | Chiang | | A47J 37/0704 |
| | | | | 126/50 |
| 2008/0000467 A1* | 1/2008 | Dudley | | A47J 37/079 |
| | | | | 126/25 B |
| 2009/0004348 A1* | 1/2009 | Silva | | A23B 4/052 |
| | | | | 426/315 |
| 2009/0064985 A1* | 3/2009 | Gustavsen | | F24B 1/003 |
| | | | | 126/21 A |
| 2009/0078246 A1* | 3/2009 | Leavens | | A47J 37/0704 |
| | | | | 126/39 H |
| 2009/0165772 A1* | 7/2009 | Hunt | | A47J 36/2477 |
| | | | | 126/26 |
| 2009/0229476 A1* | 9/2009 | Bedard | | A47J 27/04 |
| | | | | 99/447 |
| 2009/0301463 A1* | 12/2009 | Park | | A47J 36/06 |
| | | | | 126/25 R |
| 2010/0051600 A1* | 3/2010 | Maier | | F24C 15/30 |
| | | | | 219/401 |
| 2010/0084355 A1* | 4/2010 | Parks | | F24C 15/16 |
| | | | | 126/339 |
| 2010/0124596 A1* | 5/2010 | Nelson | | A23L 5/15 |
| | | | | 426/523 |
| 2010/0147281 A1* | 6/2010 | Gustavsen | | F24B 1/003 |
| | | | | 126/21 A |
| 2010/0258104 A1* | 10/2010 | DeFoort | | F24C 1/16 |
| | | | | 126/15 R |
| 2011/0132347 A1* | 6/2011 | Kim | | A47J 37/0763 |
| | | | | 126/25 R |
| 2011/0197872 A1* | 8/2011 | Thiry | | A47J 37/0763 |
| | | | | 126/25 R |
| 2011/0214662 A1* | 9/2011 | Contarino, Jr. | | A47J 37/07 |
| | | | | 126/25 R |
| 2011/0265663 A1* | 11/2011 | Li | | A47J 37/0786 |
| | | | | 126/25 R |
| 2012/0017884 A1* | 1/2012 | Van Den Hoff | | A47J 36/26 |
| | | | | 126/25 R |
| 2012/0060819 A1* | 3/2012 | Hunt | | A47J 36/2477 |
| | | | | 220/573.1 |
| 2012/0258229 A1* | 10/2012 | Mindrup | | A21D 8/06 |
| | | | | 426/556 |
| 2012/0260903 A1* | 10/2012 | Buerkle | | F23H 17/08 |
| | | | | 126/25 R |
| 2013/0081609 A1* | 4/2013 | Dhuper | | A47J 37/0781 |
| | | | | 126/25 AA |
| 2013/0112186 A1* | 5/2013 | Crichlow | | A47J 37/0718 |
| | | | | 126/30 |
| 2013/0276643 A1* | 10/2013 | Krolick | | F24B 1/003 |
| | | | | 99/447 |
| 2013/0319258 A1* | 12/2013 | Cleveland | | A47J 37/042 |
| | | | | 99/421 R |
| 2014/0026881 A1* | 1/2014 | Abrams | | A47J 37/0658 |
| | | | | 126/25 R |
| 2014/0130788 A1* | 5/2014 | Contarino, Jr. | | F24B 1/207 |
| | | | | 99/422 |
| 2014/0165851 A1* | 6/2014 | Shingler | | H05B 6/68 |
| | | | | 99/422 |
| 2014/0196609 A1* | 7/2014 | Snyman | | A47J 37/043 |
| | | | | 99/340 |
| 2014/0251160 A1* | 9/2014 | Contarino, Jr. | | A47J 37/0786 |
| | | | | 99/341 |
| 2014/0287119 A1* | 9/2014 | Dahle | | F24C 15/16 |
| | | | | 426/520 |
| 2014/0299005 A1* | 10/2014 | Vinett | | A23B 4/052 |
| | | | | 99/482 |
| 2015/0027432 A1* | 1/2015 | Contarino, Jr. | | A47J 37/0763 |
| | | | | 126/25 R |
| 2015/0034065 A1* | 2/2015 | McQuillan | | A47J 37/0713 |
| | | | | 126/25 R |
| 2015/0068512 A1* | 3/2015 | Mehler | | A47J 37/0694 |
| | | | | 126/305 |
| 2015/0079250 A1* | 3/2015 | Ahmed | | A47J 37/0704 |
| | | | | 99/481 |
| 2015/0114238 A1* | 4/2015 | Palermo | | A47J 37/0623 |
| | | | | 126/26 |
| 2015/0164278 A1* | 6/2015 | Kohler | | A47J 37/0759 |
| | | | | 99/340 |
| 2015/0201805 A1* | 7/2015 | Cedar | | A47J 37/0786 |
| | | | | 320/101 |
| 2015/0208669 A1* | 7/2015 | Klock | | A47J 37/0611 |
| | | | | 426/523 |
| 2015/0233585 A1* | 8/2015 | Creel | | F24B 1/22 |
| | | | | 29/428 |
| 2015/0289719 A1* | 10/2015 | Contarino, Jr. | | A47J 37/0786 |
| | | | | 99/341 |
| 2015/0297029 A1* | 10/2015 | Smith | | A47J 31/542 |
| | | | | 219/443.1 |
| 2015/0305560 A1* | 10/2015 | Hamlin | | A47J 37/0713 |
| | | | | 29/401.1 |
| 2015/0338104 A1* | 11/2015 | Lipinski | | F24B 1/22 |
| | | | | 126/21 R |
| 2016/0102868 A1* | 4/2016 | Johnson | | F24C 15/322 |
| | | | | 99/344 |
| 2016/0102869 A1* | 4/2016 | Johnson | | F24C 15/322 |
| | | | | 219/400 |
| 2016/0174766 A1* | 6/2016 | Schlosser | | A47J 36/06 |
| | | | | 126/25 R |
| 2016/0183723 A1* | 6/2016 | Nadal | | A47J 37/0786 |
| | | | | 126/25 R |
| 2016/0183724 A1* | 6/2016 | Nadal | | A47J 37/0763 |
| | | | | 126/25 R |
| 2016/0227965 A1* | 8/2016 | Johnston | | A47J 37/0704 |
| 2016/0302606 A1* | 10/2016 | Kallos | | A47J 27/10 |
| 2016/0334112 A1* | 11/2016 | Wiseman | | F24C 7/085 |
| 2017/0020337 A1* | 1/2017 | Borovicka | | A47J 37/0786 |
| 2017/0055535 A1* | 3/2017 | Froelicher | | A21B 1/00 |
| 2017/0102149 A1* | 4/2017 | Nadal | | A47J 37/0704 |

* cited by examiner

PIZZA OVEN ACCESSORY FOR BARBECUE GRILL

The present invention relates to cooking grills, and more particularly to an accessory for a cooking grill adapted for baking food items such as breads and pizza. This application is a Continuation application of U.S. patent application Ser. No. 15/333,600, filed on Oct. 25, 2016 (of which the entire disclosure of the pending prior application is hereby incorporated by reference).

FIELD OF THE INVENTION

Background

The present invention concerns cooking grills, and more particularly to an accessory for a cooking grill adapted for baking food items such as breads and pizza.

Referring to FIG. 4, a cooking grill 10 or barbecue grill conventionally includes a grill body, having a lower body portion typically referred to as a fire box 12, and an upper body portion or cover 14. The fire box 12 is arranged to contain a combustion source 16, for example comprising a charcoal bed, one or more gas burners, or another fuel burning arrangement, whereby the combustion source 16 provides cooking heat for the grill 10. The cover 14 may be removable from, or hingeably attached to, the fire box 12.

One or move cooking grates or surfaces is typically provided at or near an upper part of the fire box 12 above the combustion source 16, whereby a food item placed on the cooking grate or surface is heated by the combustion source 16 for cooking. The cooking grates are typically made to be removable for cleaning, and to access the fire box 12.

In pellet grills, a specialized type of cooking grill adapted to use pelletized combustible fuel such as pelletized saw dust or the like, may include a pellet burner 18 disposed near the bottom of the fire box 12, and a pellet feeding mechanism to convey fuel pellets from a hopper into the pellet burner 18. In some arrangements, a combustion fan may be provided in conjunction with the pellet burner 18, adapted to provide forced air into the pellet burner 18 for enhanced or controlled combustion.

SUMMARY

A cooking accessory insert for a cooking grill comprises a heat distribution duct having a top end and a bottom end, and a plurality of side walls depending from said top end to said bottom end, said side walls sloping inward from the top end to the bottom end. A top surface substantially covers the top end of the heat distribution duct, and a cover is disposed over the top surface. The bottom end of the heat distribution duct is open, and is adapted to cover or adjoin a burner of the grill. A baking chamber is defined by the top surface and the cover.

One or more convection channel may be provided in or alongside the top surface, opening to an interior of the heat distribution duct and providing for convective flow of heated air from the interior of the heat distribution duct to the baking chamber.

A cooking surface element, such as a baking stone or pizza stone, is provided on the top surface within the baking chamber, and may be slightly spaced above the top surface by a plurality of spacers.

Heat is transferred to the baking chamber by conduction of the side walls and top surface, convection via the convection channels and by radiation, providing an enhanced heating effect within the baking chamber.

These and other features, aspects, and advantages of the present invention will become better understood with regard to the following description, appended claims, and accompanying drawings.

DETAILED DESCRIPTION OF VARIOUS EMBODIMENTS

Figure 1B:
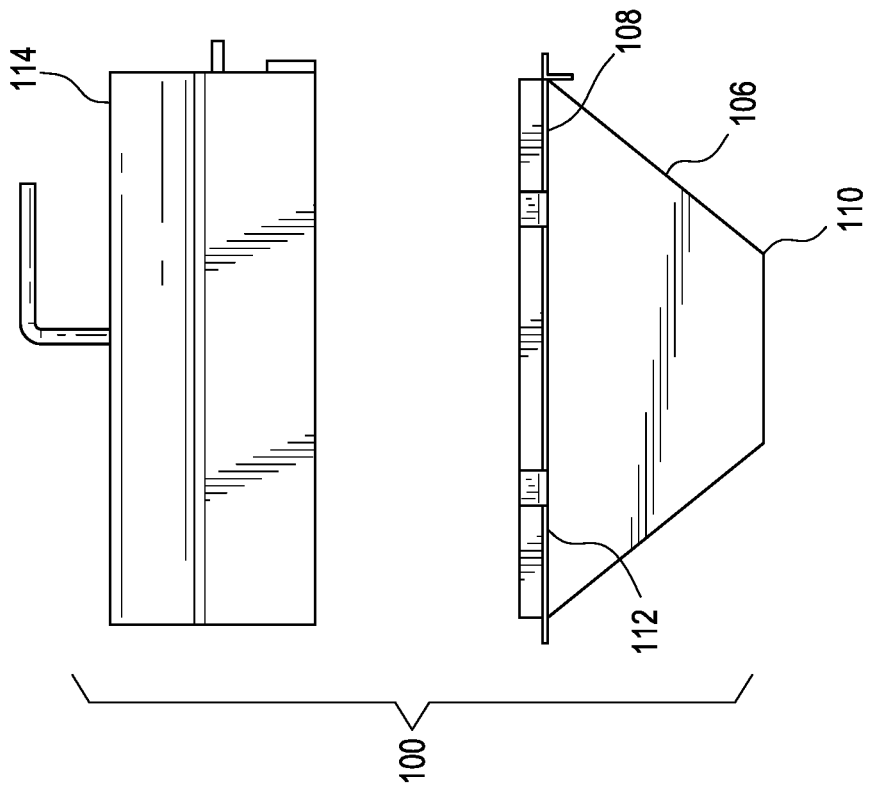
FIGS. 1A and 1B are front and side views, respectively, of an embodiment of a cooking accessory insert of the present invention.
Figure 1A:
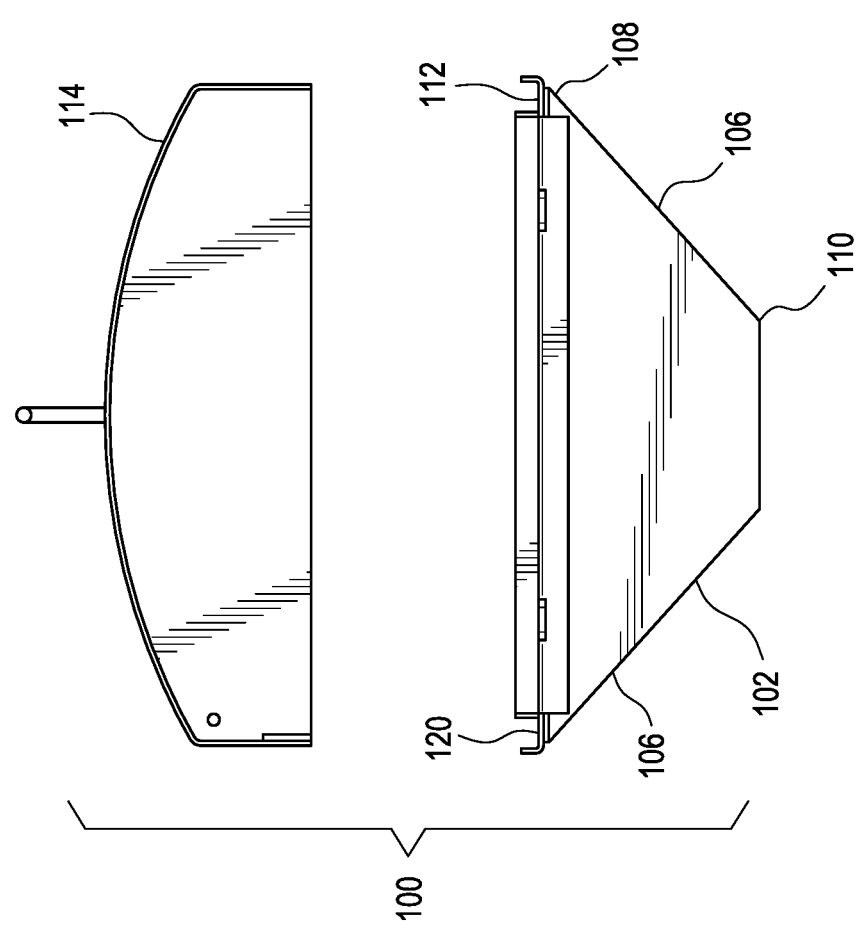
Figure 2:
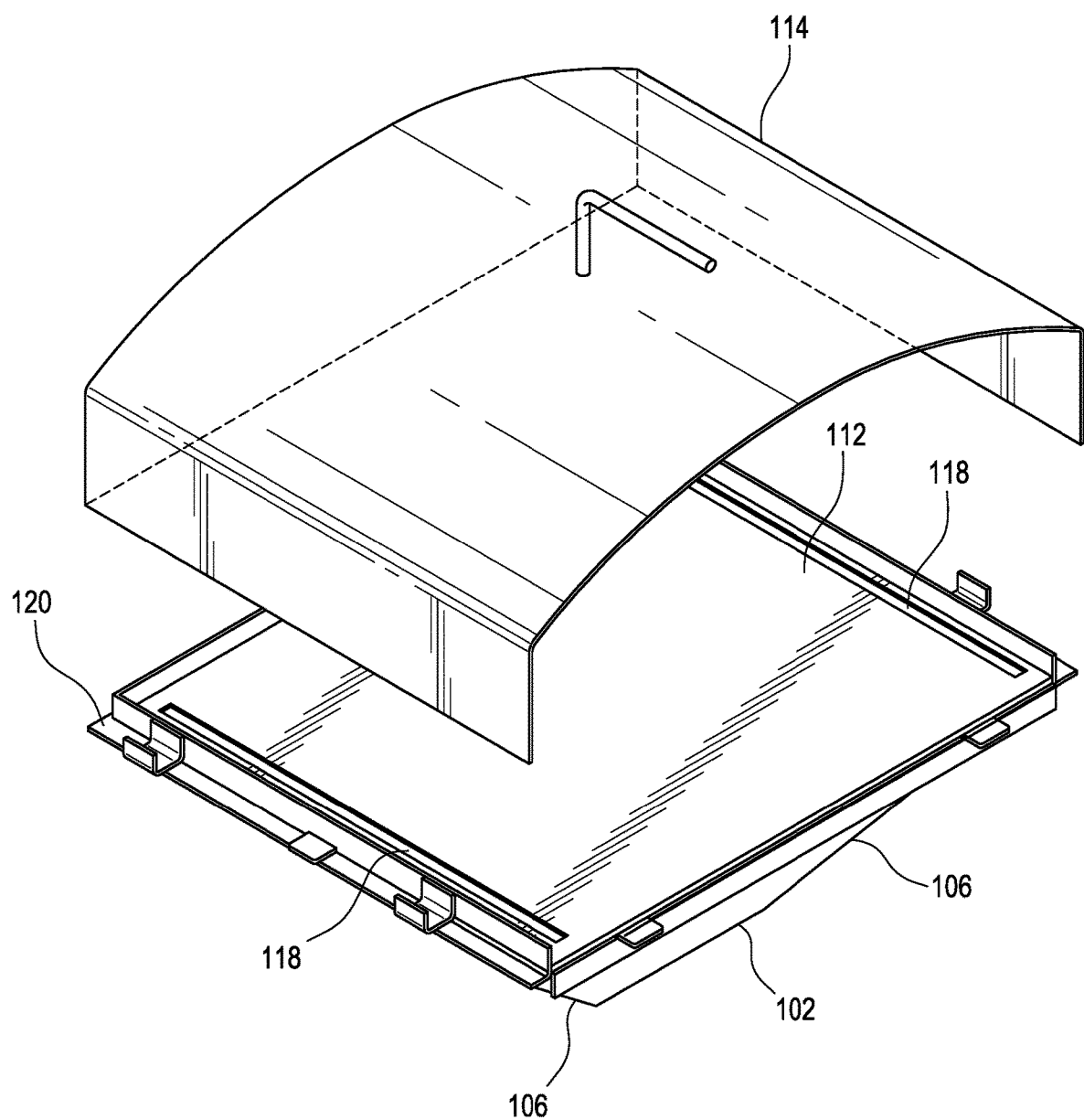
FIG. 2 is a perspective view of the embodiment of FIGS. 1A and 1B.
Figure 3:
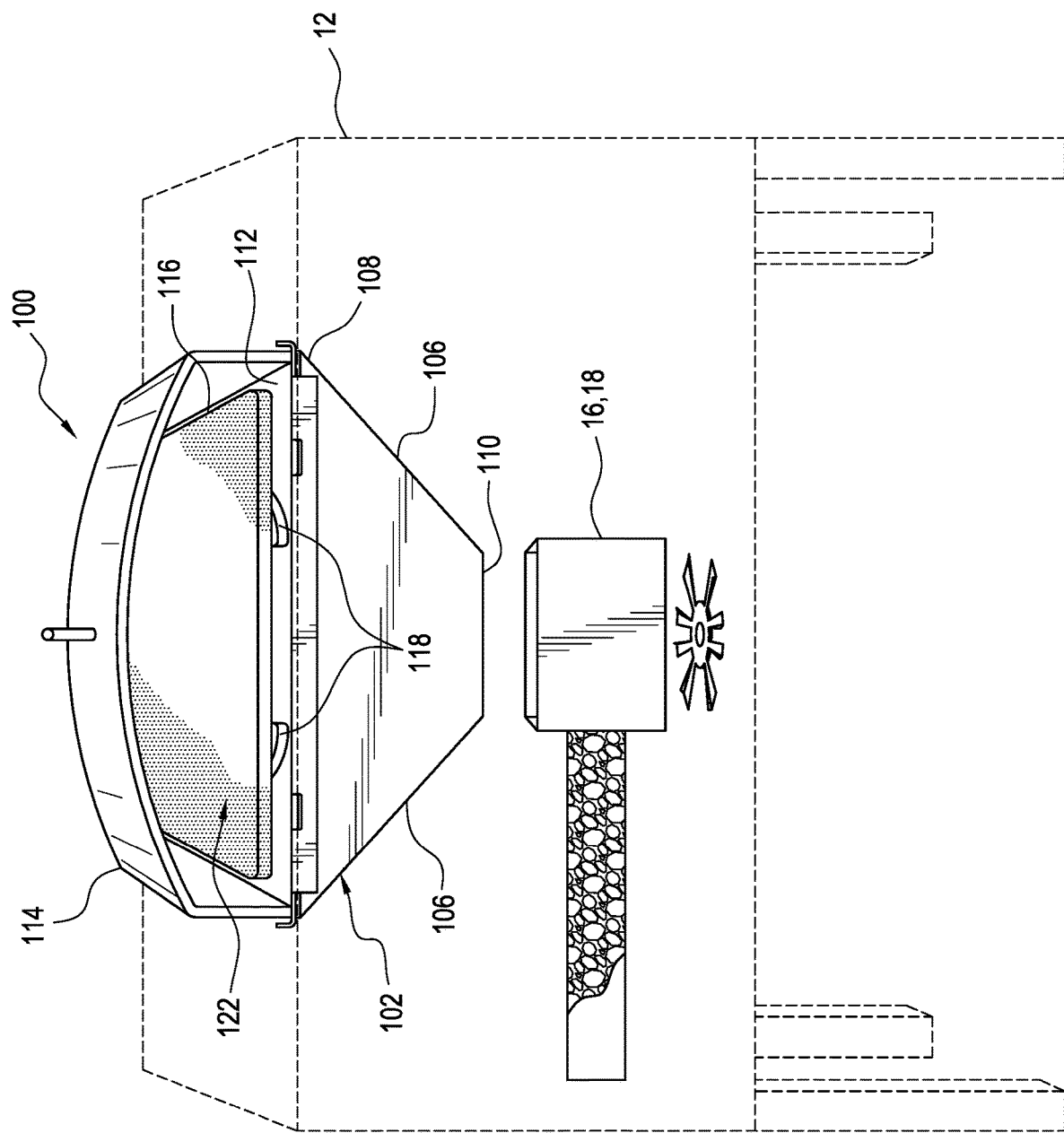
FIG. 3 is a diagrammatic view of the embodiment of FIGS. 1A and 1B as installed in a cooking grill.
Figure 4:
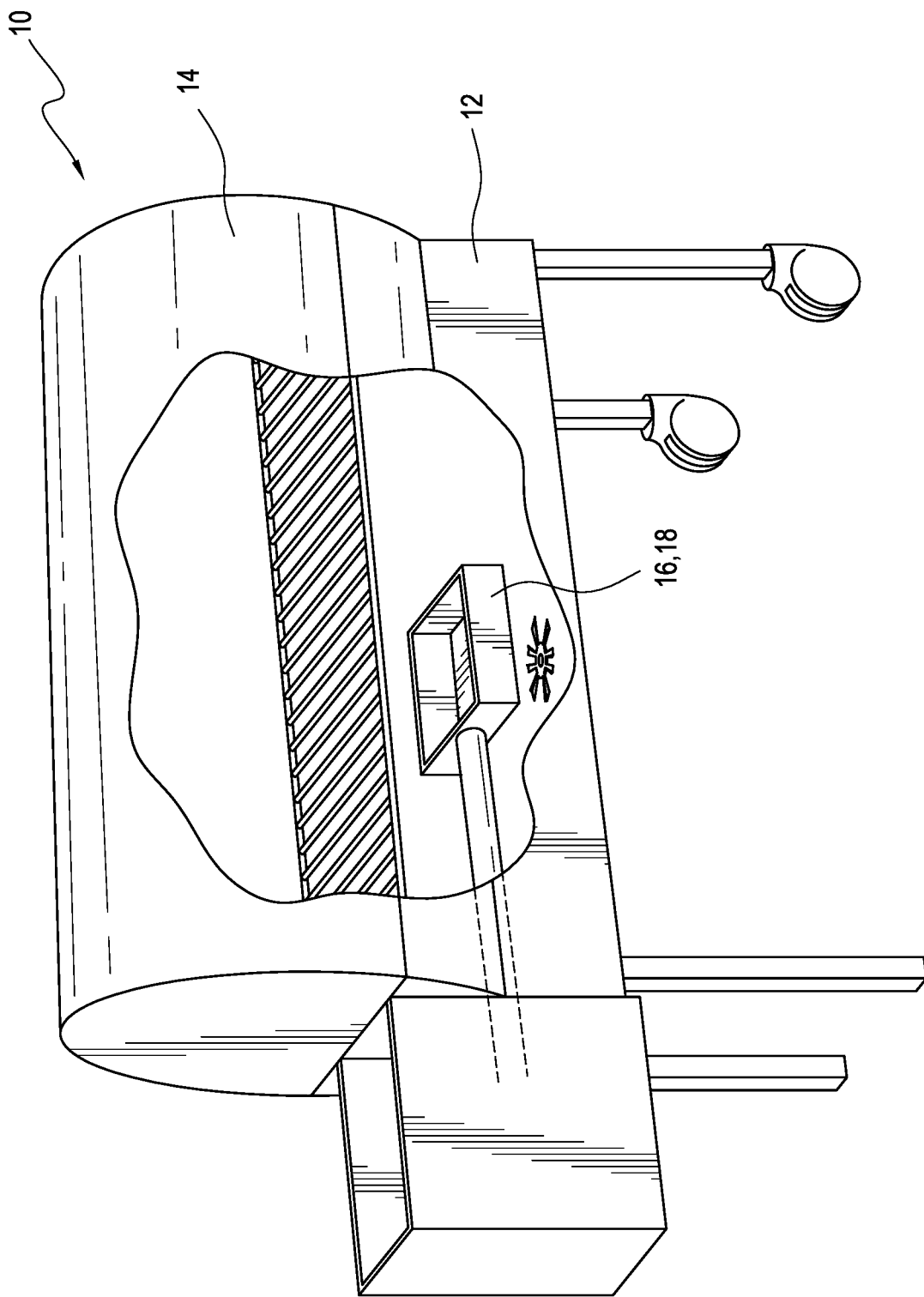
FIG. 4 is a perspective view of a conventional cooking grill.

Referring to FIGS. 1A, 1B, 2 and 3, an embodiment of a cooking accessory insert 100 for a cooking grill 10 is shown, comprising a heat distribution duct 102 that, installed in the cooking grill, extends from a heating or combustion source 16, such as a burner, typically disposed proximate to the bottom of the fire box 12 of the grill 10, generally to a cooking level near the top of the fire box 12. The heat distribution duct 102 is defined by a plurality of side walls 106 which depend from a top end 108 of the heat distribution duct 102 to a bottom end 110, and which in the illustrated embodiment taper inward, or narrow, from top to bottom. A top surface 112 substantially covers the top end 108 of the heat distribution duct 102, while the bottom end 110 is open. A cover 114 is provided covering the top surface and defining a baking chamber 122 between the cover 114 and the top surface 112. The cover 114 may be removably attached, hinged or fixed to the heat distribution duct 102. In the illustrated embodiment, the cover 114 is a generally low cover having side walls and an arcuate or domed top, defining a broad and low baking chamber 122 well configured, for example, for baking pizzas. It can be understood that other configurations are within the scope of the invention.

When the cooking accessory insert 100 is installed in a grill, the bottom end 110 is arranged over, or covering, a burner or combustion source of the grill, while the top surface 112 is arranged generally at a cooking level near the top of the grill's fire box 12. Supporting elements may be provided on the cooking accessory insert 100 to hold and stabilize the cooking accessory insert 100 within the grill 10. Such supporting elements may be fixed to accommodate a specific type of grill, or adjustable to accommodate different grill dimensions. Particularly in embodiments adapted for use with a pellet grill, the bottom end 110 of the heat distribution duct 102 may be configured to cover or mate with a combustion source 16 such as a pellet burner at the bottom of the fire box 12.

A cooking surface element 116 is disposed on the top surface of the heat distribution duct 102, such as a cooking stone, baking stone or pizza stone. The cooking surface element 116 is spaced above the top surface 112 by a plurality of spacers, and is preferably removable for cleaning.

In order to provide heat convection into the baking chamber 122, at least one convection channel 118 is provided in or alongside the top surface 112, open to an interior of the heat distribution duct 102.

In the illustrated embodiment, the side walls 106 of the heat distribution duct 102 define an inverted, truncated pyramid shape between the top end 108 and said bottom end 110, although other shapes are suitable.

In use, one or more cooking grates are removed from a grill to allow placement of the cooking accessory insert 100 into the grill's fire box, with the bottom end 110 of the heat distribution duct 102 proximate to, and preferably directly over and covering, a burner or the grill such that heat and flames of the burner are received within the internal space of the heat distribution duct 102, heating the heat distribution duct 102 and in particular providing cooking heat to the top surface, the baking stone and the baking chamber.

The cooking accessory insert 100 raises the internal temperature of the grill to that of a pizza oven, by funneling the heat from the burner directly up and into the baking chamber 122, reaching temperatures as high as 750° F. The heat distribution duct 102 combines convective, conductive, and radiant heating in and around the baking chamber. A thermometer or electronic temperature sensor, or an adapter configured to receive and hold a thermometer or electronic temperature sensor, may be provided on a portion of the cooking accessory insert 100, such as on the cover 114 of the cooking accessory insert 100. For example, an electronic temperature sensor may be used in conjunction with a fuel delivery apparatus, such as a pellet feeding mechanism in a pellet grill, and more particularly in conjunction with a control circuit, element or apparatus controlling such pellet feeding mechanism. Alternatively, a thermometer or electronic temperature sensor may be provided elsewhere in the grill externally from the cooking accessory insert 100.

As can be well understood, the various parts of the cooking accessory insert 100 should be constructed of a heat durable, and heat conductive, material. In particular, the elements of the heat distribution duct 102 and cover 114 are preferably formed of stainless steel, while the cooking surface element 116 is preferably a cooking stone, baking stone or pizza stone comprising a ceramic or stone material.

It will be understood that the above-described embodiments of the invention are illustrative in nature, and that modifications thereof may occur to those skilled in the art with the benefit of the teachings of this specification, without departing from the scope and spirit of the invention as defined by the appended claims. Accordingly, this invention is not to be regarded as limited to the embodiments disclosed herein, but is to be limited only as defined in the appended claims.

I claim:

1. A cooking accessory insert for a cooking grill, the cooking grill having a firebox and a burner disposed within the firebox, the cooking accessory comprising:
    a heat distribution duct having a top end and a bottom end, and a plurality of side walls extending from said top end to said bottom end and defining an open interior space of said heat distribution duct, said plurality of side walls sloping inward from the top end to a bottom end where bottom edges of the side walls define an opening formed at the bottom end;
    a flat top surface that substantially covers and closes the top end of said heat distribution duct; and
    a pair of convection channels provided in the flat top surface, each convection channel being located proximate to and inside one of a pair of opposite side edges of said top surface, the convection channels being open to an interior of the heat distribution duct to provide convective communication between said interior of said heat distribution duct and a cooking space above said flat top surface; and
    a cover having a cover top and at least a pair of cover side walls extending from side edges of the cover top to opposite side edges of said flat top surface, wherein a partially enclosed cooking space is defined between said cover and said flat top surface;
    wherein said heat distribution duct is configured for removable placement within the firebox of the grill with said bottom end positioned proximate to a top of the burner and with said opening positioned in convective communication with the burner.

2. The cooking accessory insert for a cooking grill according to claim 1, further comprising a cooking surface element disposed on said top surface of said heat distribution duct.

3. The cooking accessory insert for a cooking grill according to claim 2, wherein said cooking surface element is a baking stone.

4. The cooking accessory insert for a cooking grill according to claim 2, wherein said cooking surface element is spaced above said top surface by a plurality of spacers.

5. The cooking accessory insert for a cooking grill according to claim 1, wherein said plurality of side walls define an inverted, truncated pyramid shape between said top end and said bottom end.

6. The cooking accessory insert for a cooking grill according to claim 1, further comprising:
    at least one supporting element extending laterally the top end or the top surface, wherein the at least one supporting element is adapted to engage with a part of the grill to support said heat distribution duct within the firebox of the grill.

7. The cooking accessory insert for a cooking grill according to claim 1, wherein said bottom end of said heat distribution duct is adapted to adjoin a burner of the cooking grill.

8. The cooking accessory insert for a cooking grill according to claim 1, wherein:
    said cover comprises said cover top, said at least a pair of cover side walls extending downward from said cover top and an open front; and
    wherein said cover is removable.

* * * * *